United States Patent
Choi

(10) Patent No.: US 7,637,347 B2
(45) Date of Patent: Dec. 29, 2009

(54) ELECTRIC POWER STEERING APPARATUS EQUIPPED WITH STEERING ANGLE SENSOR

(75) Inventor: Jung Rak Choi, Yongin-si (KR)

(73) Assignee: Mando Corporation, Pyeongtaek-si (KR)

( * ) Notice: Subject to any disclaimer, the term of this patent is extended or adjusted under 35 U.S.C. 154(b) by 374 days.

(21) Appl. No.: 11/638,653

(22) Filed: Dec. 12, 2006

(65) Prior Publication Data

US 2007/0175697 A1 Aug. 2, 2007

(30) Foreign Application Priority Data

Jan. 12, 2006 (KR) .................. 10-2006-0003511

(51) Int. Cl.
 *B62D 5/04* (2006.01)
(52) U.S. Cl. ..................................... 180/444
(58) Field of Classification Search ........... 180/444, 180/443, 446
 See application file for complete search history.

(56) References Cited

U.S. PATENT DOCUMENTS

| | | | | |
|---|---|---|---|---|
| 4,483,293 A | * | 11/1984 | Akasu | 123/406.53 |
| 4,786,866 A | * | 11/1988 | Yabe et al. | 324/772 |
| 4,939,435 A | * | 7/1990 | Takahashi et al. | 318/432 |
| 6,155,106 A | * | 12/2000 | Sano | 73/117.02 |
| 6,354,396 B1 | * | 3/2002 | Horton et al. | 180/446 |
| 7,500,538 B2 | * | 3/2009 | Hara et al. | 180/412 |
| 2003/0111974 A1 | * | 6/2003 | Suzuki | 318/661 |

FOREIGN PATENT DOCUMENTS

| | | | |
|---|---|---|---|
| EP | 982564 A1 | * | 3/2000 |
| JP | 2000-203443 | | 7/2000 |
| JP | 2002-131049 | | 5/2002 |
| JP | 2002-156224 | | 5/2002 |
| KR | 20010006572 | | 1/2001 |
| WO | WO 2005105550 A1 | * | 11/2005 |

OTHER PUBLICATIONS

Japanese Office Action for Application No. 2006-353174, dated Apr. 23, 2009.

* cited by examiner

*Primary Examiner*—Kevin Hurley
(74) *Attorney, Agent, or Firm*—Lahive & Cockfield, LLP; EuiHoon Lee, Esq.

(57) ABSTRACT

Disclosed is an electric power steering apparatus which includes: a steering shaft connected to a steering wheel of a vehicle; an electric motor for supplying auxiliary steering power; a direction sensor including a light emitting unit and a light receiving unit which face each other; a rotary member interposed between the light emitting unit and the light receiving unit, having at least one slot and rotating as the steering shaft rotates; a motor position sensor for detecting a rotation angle of a rotation shaft of the electric motor; and a control unit receiving electric signals from the direction sensor and the motor position sensor to calculate a steering angle.

8 Claims, 9 Drawing Sheets

ELECTRIC POWER STEERING APPARATUS EQUIPPED WITH STEERING ANGLE SENSOR

RELATED APPLICATION

This application claims convention priority to Korean patent application No. 2006-3511 filed on Jan. 12, 2006, the content of which is incorporated by reference.

FIELD OF THE INVENTION

The present invention relates to an electric power steering apparatus equipped with a steering angle sensor. More particularly, the present invention relates to an electric power steering apparatus, which is provided with a steering angle sensor including a direction sensor for detecting a rotation direction of the steering shaft through multi-step reduction gears and a sensor for detecting a rotation angle of a motor shaft, so as to detect an absolute steering angle of a steering shaft, thereby reducing a manufacturing cost of the steering apparatus.

BACKGROUND OF THE INVENTION

Generally, hydraulic power steering apparatuses using hydraulic pressure of a hydraulic pump have been used as power steering apparatuses for vehicles. Since the 1990's, electric power steering apparatuses using an electric motor have been eventually popularized.

In a conventional hydraulic steering apparatus, a hydraulic pump, which is a power source providing power for the hydraulic steering apparatus, is operated by the engine of a vehicle, and always consumes energy regardless of the rotation of a steering wheel. In an electric power steering apparatus, on the other hand, if a steering wheel rotates and generates torque, an electric motor which is operated by electric energy provides assistant steering power. Therefore, when the electric power steering apparatus is used, it is possible to improve energy efficiency in comparison with the hydraulic power steering apparatus.

FIG. 1 is a schematic view showing a configuration of a conventional electric power steering apparatus for a vehicle.

As shown in FIG. 1, the conventional electric power steering apparatus includes a steering system 100 extending from a steering wheel 101 to both wheels 108, and an assistant power mechanism 120 for providing assistant steering power.

The steering system 100 includes a steering shaft 102 having an end connected to the steering wheel 101 to rotate along with the steering wheel 101, and the other end connected to a pinion shaft 104 by a pair of universal joints 103. Further, the pinion shaft 104 is connected to a rack bar 109 through a rack-pinion mechanism 105, while both ends of the rack bar 109 are connected to both wheels of the vehicle by tie rods 106 and knuckle arms 107, respectively.

The rack-pinion mechanism 105 has a pinion gear 111 mounted on the pinion shaft 104, and a rack gear 112 formed on a peripheral surface of one end of the rack bar 109 and engaged with the pinion gear 111. When a driver operates the steering wheel 101, torque is generated in the steering system 100 and causes the rack-pinion mechanism 105 and the tie rods 106 to steer the wheels 108.

The assistant power mechanism 120 includes a torque sensor 121 for sensing torque applied to the steering wheel 101 by the driver so as to output an electric signal in proportion to the sensed torque, an electronic control unit 123 for generating a control signal depending on the electric signal transmitted from the torque sensor 121, and an electric motor 130 for generating assistant steering power based on the control signal transmitted from the electronic control unit 123.

Accordingly, in the electric power steering apparatus, the torque generated by the rotation of the steering wheel 101 is transmitted through the rack-pinion mechanism 105 to the rack bar 109. The assistant steering power which the electric motor 130 generates depending on the generated torque, is transmitted to the rack bar 109. In other words, the rack bar 109 is moved along an axis thereof by the torque generated in the steering system 100 and the assistant power generated from the electric motor 130.

In such an electric power steering apparatus, the steering sensor gives the electronic control unit information on the rotation angle or angular velocity of the steering wheel with respect to an initial position of the steering wheel in a driving vehicle. The electronic control unit carries out a roll control or an orbiting control.

FIG. 2 is a block diagram illustrating a method for measuring a steering angle of the conventional steering apparatus.

As shown in FIG. 2, in the method for measuring the steering angle of the conventional steering apparatus, a steering angle sensor 200 obtains steering information using an optical sensor and a slit disc, and transmits the obtained information to an electronic control unit 123. The electronic control unit 123 calculates a steering angle and an angular velocity of the steering wheel.

Further, the steering angle sensor 200 according to the conventional art includes the optical sensor 301 and the slit disc 303, as shown in FIGS. 3 and 4. A column switch including the optical sensor 301 is fixed to a steering column, and the slit disc 303 is mounted on the steering shaft 102 to rotate along with the steering wheel when the steering wheel rotates.

The slit disc 303 is interposed between a light emitting unit 401 and a light receiving unit 403 of the optical sensor 301 so as to rotate along with the steering shaft 102 when the steering wheel is operated. At this time, an electric signal is determined according to whether the light from the light emitting unit 401 is transmitted to the light receiving unit 403.

FIG. 5 is a view showing a waveform of output signals of the steering angle sensor according to the conventional art.

As shown in FIG. 5, there exists a difference in voltage according to whether the light from the light emitting unit is transmitted to the light receiving unit, or not. The electric signal resulting from the change of voltage is transmitted to the electronic control unit, so that the electronic control unit can measure the steering angle.

However, the steering angle sensor according to the conventional art has a problem in that the steering angles of 0 degree, ±360 degrees, and ±720 degrees are regarded as the same angle. In other words, there is a disadvantage in that the steering sensor cannot distinguish clockwise rotation and counterclockwise rotation.

In order to solve such problems, a high-performance absolute steering sensor should be used for measuring an absolute steering angle. However, since the absolute steering sensor is an expensive element, it causes an increase in manufacturing costs of the steering apparatus.

In order to solve the above-mentioned problems of the conventional art, the present applicant has developed a steering apparatus, which is disclosed in Korean Patent Application No. 10-2005-72953. However, there is a problem in that it is difficult to install the steering apparatus, disclosed in the above-mentioned application, in a narrow space.

SUMMARY OF THE INVENTION

Accordingly, the present invention has been made to solve the above-mentioned problems occurring in the prior art, and it is an object of the present invention to provide an electric power steering apparatus, which is provided with a steering angle sensor including a direction sensor for detecting a rotation direction of the steering shaft through multi-step reduction gears and a sensor for detecting a rotation angle of a motor shaft, so as to detect an absolute steering angle of a steering shaft, thereby reducing a manufacturing cost of the steering apparatus.

According to an aspect of the present invention, there is provided an electric power steering apparatus comprising: a steering shaft connected to a steering wheel of a vehicle; an electric motor for supplying auxiliary steering power; a direction sensor including a light emitting unit and a light receiving unit which face each other; a rotary member interposed between the light emitting unit and the light receiving unit, having at least one slot and rotating as the steering shaft rotates; a motor position sensor for detecting a rotation angle of a rotation shaft of the electric motor; and a control unit receiving electric signals from the direction sensor and the motor position sensor to calculate a steering angle.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
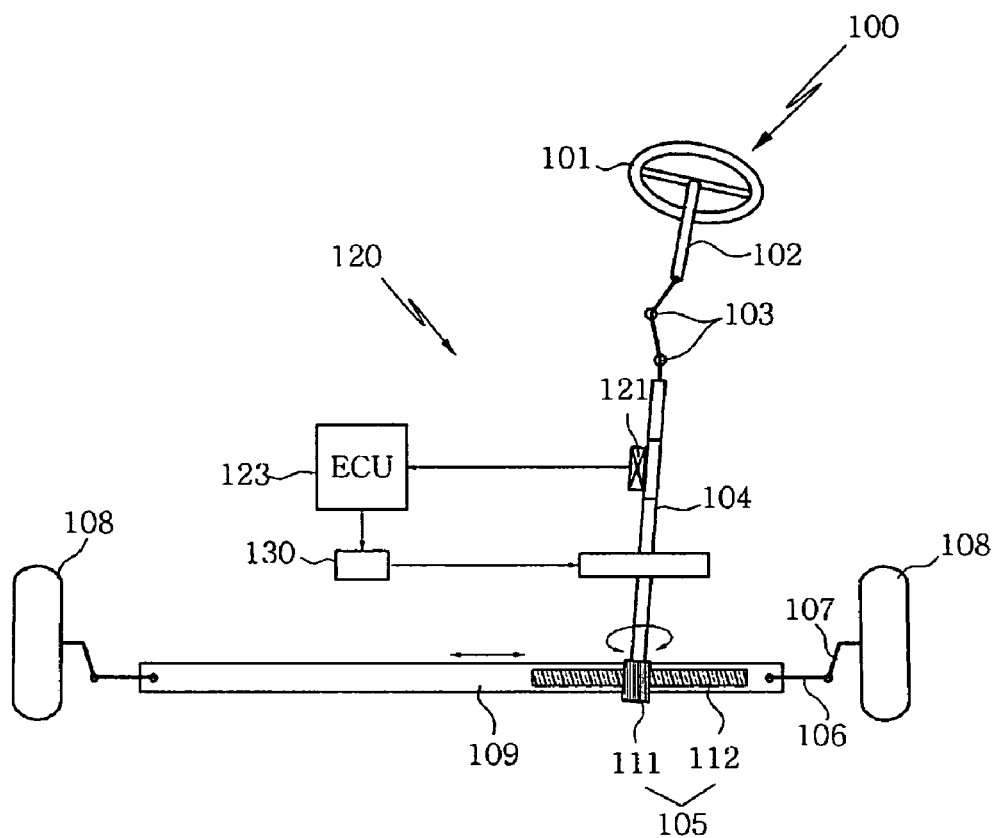
FIG. 1 is a schematic view showing a configuration of a conventional electric power steering apparatus.
Figure 2:
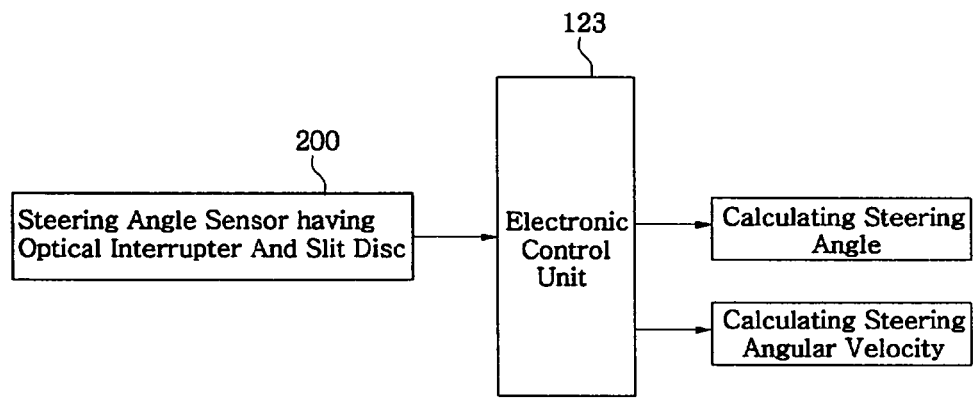
FIG. 2 is a block diagram illustrating a method for measuring a steering angle according to a conventional art.
Figure 3:
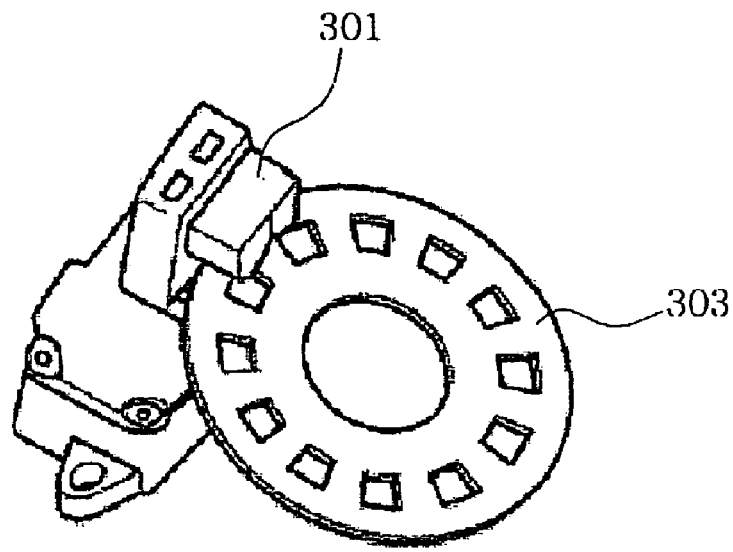
FIG. 3 is a schematic view showing a configuration of a conventional steering angle sensor.
Figure 4:
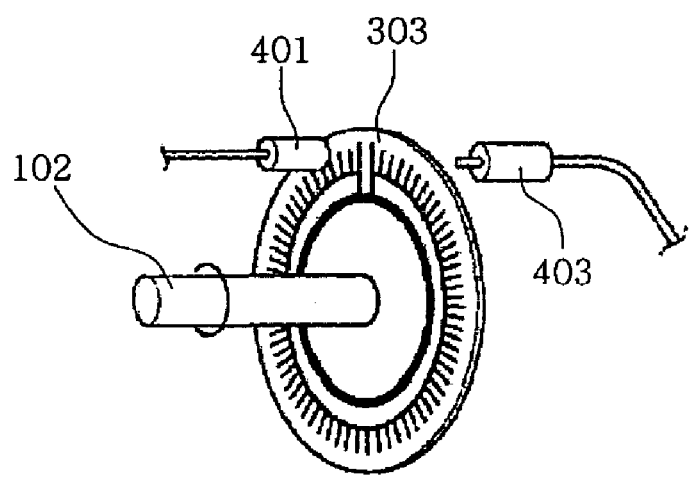
FIG. 4 is a schematic view illustrating a principle of the conventional steering angle sensor.
Figure 5:
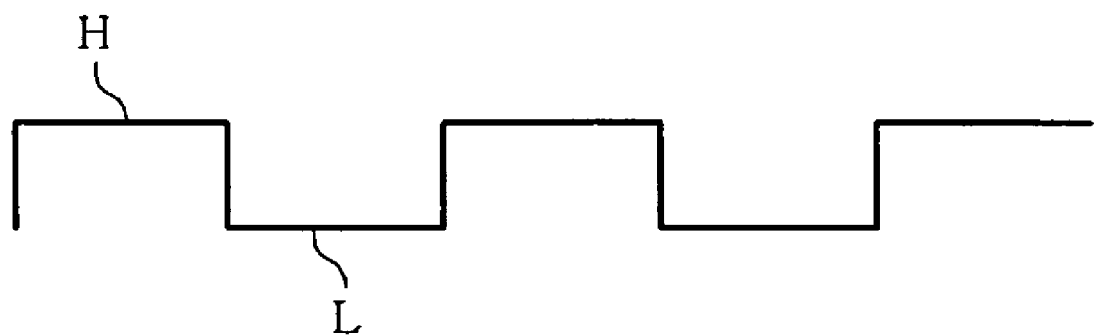
FIG. 5 is a view showing a waveform of an output signal of the conventional steering angle sensor.

Reference will now be made in detail to the preferred embodiment of the present invention. It should be noted that the similar components are designated by similar reference numerals although they are illustrated in different drawings.

Also, in the following description, a detailed description of known functions and configurations incorporated herein will be omitted when it may obscure the subject matter of the present invention.

Figure 6A:
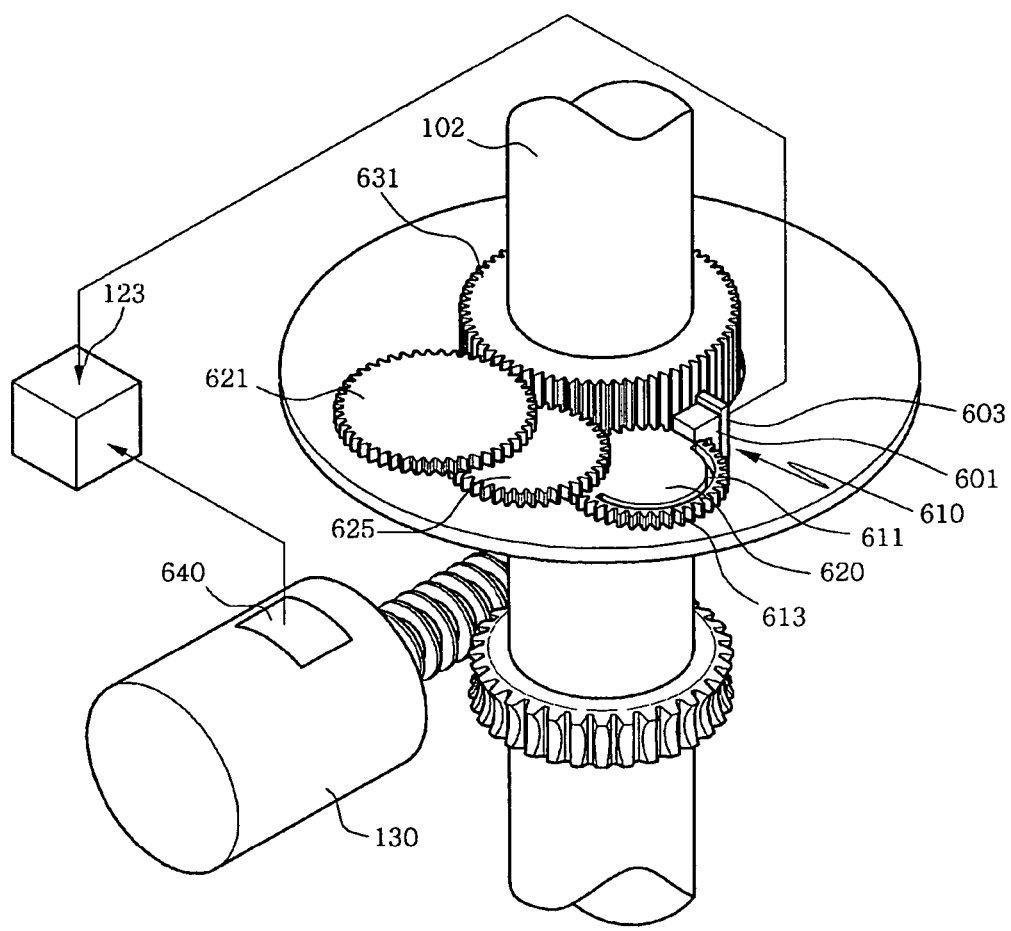
FIG. 6A is a perspective view showing a steering angle sensor according to the first embodiment of the present invention.
Figure 6B:
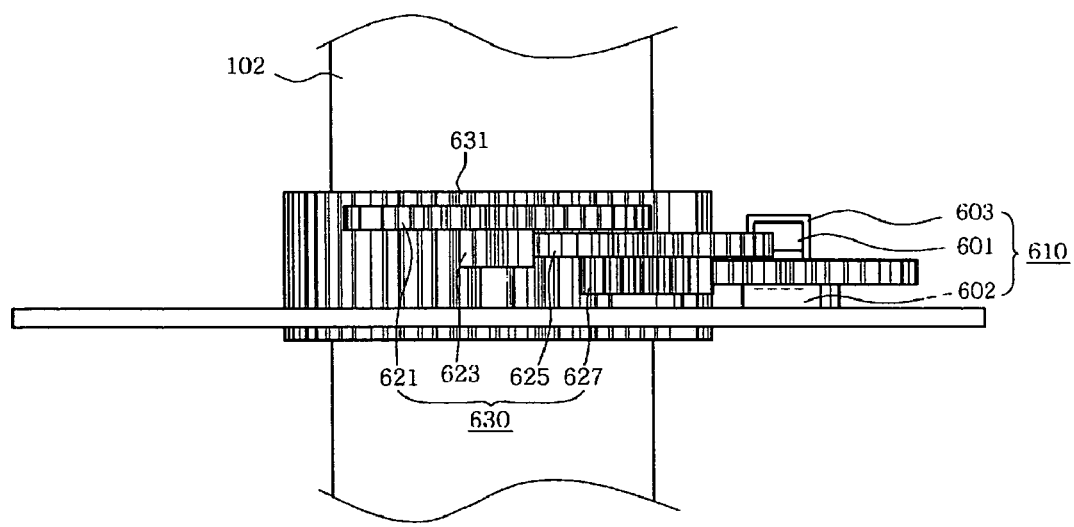
FIG. 6B is a side view showing the steering angle sensor according to the first embodiment of the present invention.
Figure 7:
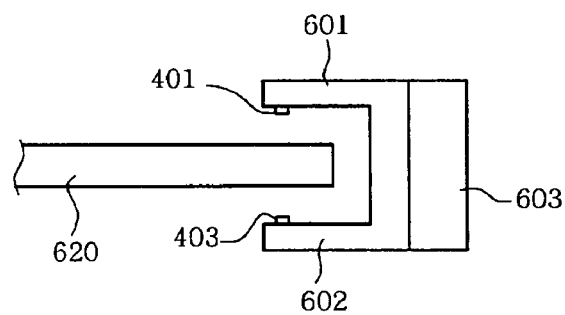
FIG. 7 is a partial sectional view showing the steering angle sensor according to the first embodiment of the present invention.

FIG. 6A is a perspective view showing a steering angle sensor according to the first embodiment of the present invention, and FIG. 6B is a side view showing the steering angle sensor according to the first embodiment of the present invention. FIG. 7 is a partial sectional view showing the steering angle sensor according to the first embodiment of the present invention.

As shown in FIGS. 6A, 6B and 7, the steering angle sensor according to the first embodiment of the present invention includes a direction sensor 610 having a light emitting unit 601 and a light receiving unit 602, a rotary member 620 rotating and passing between the light emitting unit 601 and the light receiving unit 602 of the direction sensor 610 according to the rotation of the steering shaft 102 and having slots 611 formed therein, a reduction gear 630 disposed between the steering shaft 102 and the rotary member 620, a motor position sensor 640 provided on a motor 130 supplying auxiliary power to the steering shaft 102 for detecting a rotation angle of the motor shaft, and an electronic control unit 123 receiving electric signal from the direction sensor 610 and the motor position sensor 640 so as to calculate a steering angle.

The direction sensor includes the light emitting unit 601, the light receiving unit 602, and a circuit board 603.

The light emitting unit 601 and the light receiving unit 602 are arranged to face each other. The light emitting unit 601 generates and transmits signal such as an electric signal, a magnetic signal or an optical signal to the light receiving unit 602.

The rotary member 620 rotates between the light emitting unit 601 and the light receiving unit 602 having such a configuration so as to interrupt and allow the signal generated by the light emitting unit 601 to pass through the rotary member 620, thereby making it possible for the direction sensor 610 to detect a rotation direction of the steering shaft 102.

An optical sensor including a light emitting element 401 and a light receiving element 403 is used as the direction sensor 610. A Light Emitting Diode (LED) may be used as the light emitting element 401, and a phototransistor may be used as the light receiving element 403. However, the light emitting element and the light receiving element are not limited to the LED and phototransistor.

The circuit board 603 is connected to the light emitting unit 601 and the light receiving unit 602, and supplies electricity to the light emitting unit 601. When a specific electric signal is generated as the light receiving unit 602 receives or does not receive a signal, the circuit board 603 transmits the generated signal to the electronic control unit 123. Generally, a Printed Circuit Board (PCB) is used as a circuit board 604, but the circuit board is not limited to the PCB.

The reduction gear 630 reduces the rotation velocity of the steering shaft 102 and transmits the rotation force to the rotation member 620. The reduction gear 630 includes the first reduction gear 621, the second reduction gear 623, the third reduction gear 625 and the fourth reduction gear 627. A conventional spur gear or helical gear may be used as the reduction gear 630.

Figure 8:
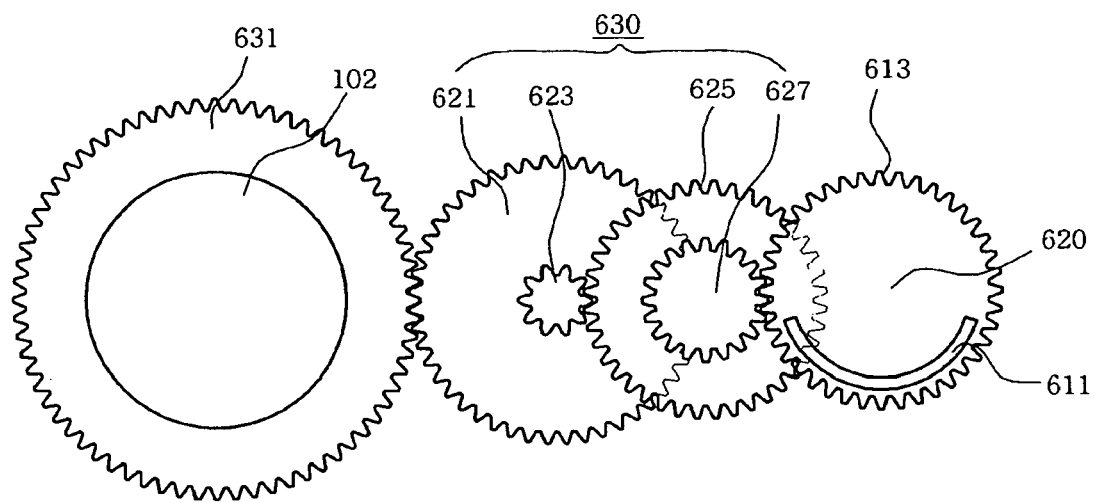
FIG. 8 is a schematic view showing a reduction gear.

FIG. 8 is a schematic view showing the reduction gear.

As shown in FIG. 8, the reduction gear 630 is disposed between the first and second gears 631 and 613. The rotation force of the first gear 631 is finally transmitted through the reduction gear 630 to the second gear 613. Further, the first gear 631 rotates in a direction opposite to the second gear 613, but this is changed according to the number of gears in the reduction gear 630.

The first reduction gear 621 is engaged with the first gear 631 formed on an outer peripheral surface of the steering shaft 102 and rotates. The first gear 631 has seventy teeth, while the first reduction gear 621 has fifty teeth. Therefore, the gear ratio of the first gear 631 to the first reduction gear 621 is 7:5.

The second reduction gear 623 is formed on a surface of the first reduction gear 621 and is coaxial with the first reduction gear 621. The third reduction gear 625 is engaged with the second reduction gear 623 to rotate. The second reduction gear 623 has ten teeth, and the third reduction gear 625 has forty teeth. Thus, the gear ratio of the second reduction gear 623 to the third reduction gear 625 is 1:4.

The fourth reduction gear 627 is coaxially formed on a surface of the third reduction gear 625, and is engaged with the second gear 613 formed on an outer peripheral surface of the rotary member 620 and rotate. The fourth reduction gear 627 has twenty teeth, and the second gear has forty-two teeth. Therefore, the gear ratio of the fourth reduction gear 627 to the second gear 613 is 10:21.

The final reduction gear ratio of the second gear 613 to the first gear 631 according to the operation of the reduction gear 630 is 1:4. In other words, when the steering shaft 102 rotates four times, the rotary member 620 rotates one time.

As described above, the rotation angle of the rotary member 620 depending on the rotation of the steering shaft 102 can be adjusted by modifying the number of teeth of the first gear 631, the reduction gear 630, and the second gear 613.

Further, the first reduction gear 621 and the second reduction gear 623 are integrally formed to be coaxial with each other, and the third reduction gear 625 and the fourth reduction gear 627 are integrally formed to be coaxial with each other. Thus, they are disposed on surfaces in parallel. In this case, it is possible to minimize the space the gears occupy by adjusting the number and the thickness of the gears.

In addition, since the teeth of the second reduction gear 623 are less than those of the third reduction gear 625, the first reduction gear 621 overlaps with the third reduction gear 625. Therefore, it is possible to reduce the space to an extent where the first reduction gear 621 overlaps with the third reduction gear 625.

The motor position sensor 640 is a device which is mounted on an electric motor 130 and senses the rotation angle of the rotation shaft of the electric motor when the electric motor operates. The motor position sensor 640 detects the rotation angle of the rotation shaft of the electric motor and generates a pulse corresponding to a specific angle. Then, the motor position sensor transmits the generated pulse to the electronic control unit 123.

The electronic control unit 123 is a unit which receives information on the velocity of a vehicle, steering torque, and a position of the rotation shaft of the electric motor, which are detected and converted in electric signals by various sensors including a speed sensor, a torque sensor, and a motor position sensor. Specifically, according to the present invention, the electronic control unit 123 receives electric signals from the direction sensor 610 detecting a rotation direction of the steering shaft, and also receives information on the variation of the rotation angle of the rotation shaft of the electric motor from the motor position sensor 640, so as to calculate the steering angle.

Figure 9A:
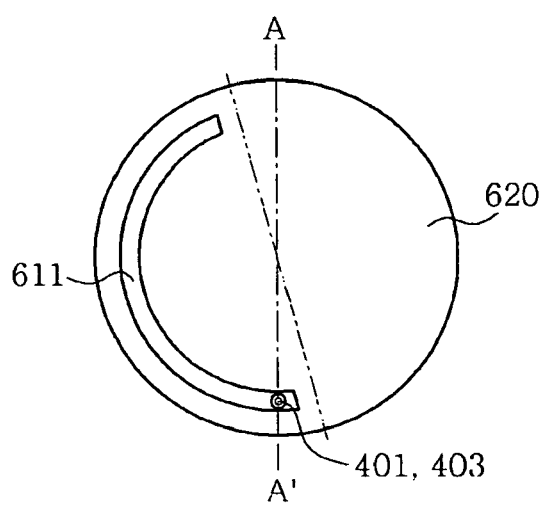
FIGS. 9A, 9B, and 9C are plan views showing the operation of a direction sensor according to the one-directional rotation of the steering shaft, respectively.
Figure 9B:
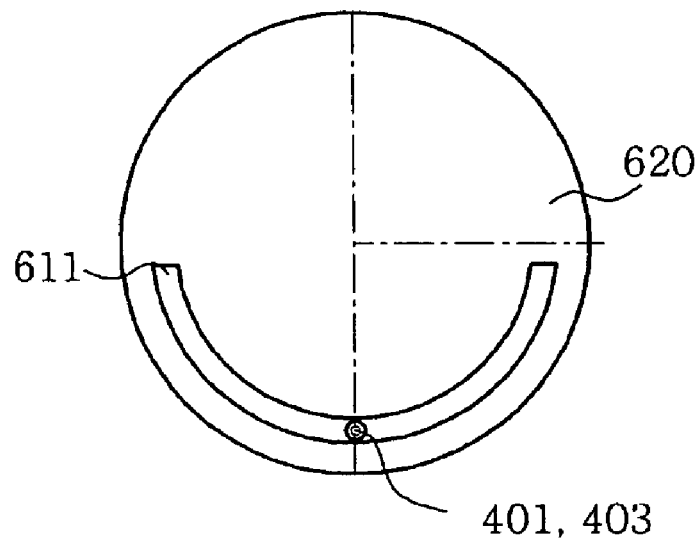
Figure 9C:
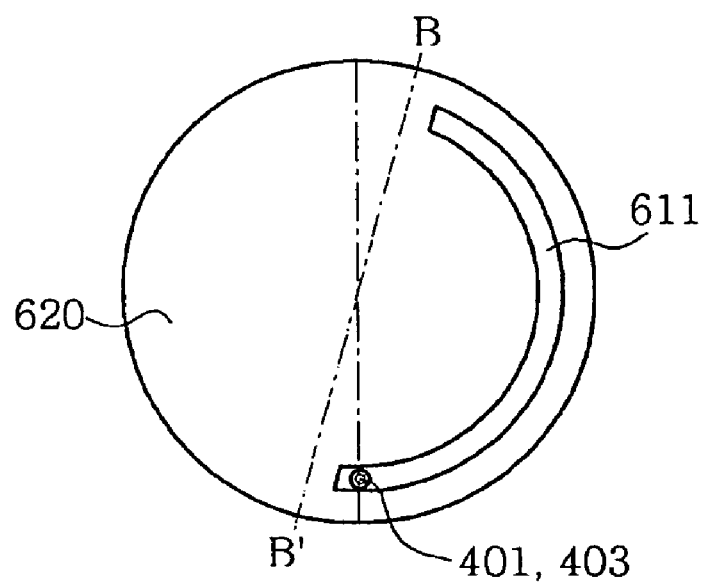

FIGS. 9A, 9B, and 9C are plan views showing the operation of the direction sensor according to one-way rotation of the steering shaft, respectively.

Hereinafter, the operation of the steering angle sensor according to the preferred embodiment of the present invention will be described with reference to FIGS. 9A, 9B, and 9C.

When the steering wheel of the vehicle rotates by a certain angle in a counterclockwise direction from an initial neutral position A-A', at the same time, the rotary member 620, which is interposed between the light emitting unit 605 and the light receiving unit 607, rotates by a certain angle in a clockwise direction from the neutral position A-A' so as to allow light from the light emitting unit 605 to pass through a slot 611. Further, as the steering shaft 102 rotates in a clockwise direction, the rotary member 620 rotates in a counterclockwise direction and reaches the final location B-B'. During the rotation of the rotary member 620, the rotary member 620 allows the light from the light emitting unit 605 to pass through the slot 611 of the rotary member 613 and reach the light receiving unit 607. Therefore, in this case, electric signals are constantly transmitted from the direction sensor to the electronic control unit.

For example, when a driver operates the steering wheel and turns right so that the rotary member stays in the above-mentioned situation, the electronic control unit detects that the steering wheel of the current vehicle has rotated right.

On the other hand, the motor position sensor transmits electric signals to the electronic control unit every time the rotation shaft of the electric motor rotates by a certain angle. Thus, the electronic control unit can be aware of the rotation angle of the rotation shaft of the electric motor through such electric signals, and can also calculate the rotation angle of the steering shaft if it calculates the rotation angle of the rotation shaft of the electric motor and the reduction ratio of a worm wheel to a worm. In other words, if the rotation angle of the rotation shaft of the electric motor sensed by the motor position sensor is 0.28 degree and the reduction ratio of the worm wheel to the worm is 4:1, the absolute steering angle is 1.12 degrees (0.28×4).

The electric signals transmitted from the direction sensor indicate the rotation direction of the steering shaft, and the electric signals transmitted from the motor position sensor refer to the rotation angle of the steering shaft. Hence, it is possible to identify the rotation direction and the absolute rotation angle of the steering shaft.

Such a principle is applicable to the case where the steering shaft rotates in any direction, for example, clockwise or counterclockwise. Further, when the steering shaft, which has rotated in a direction, rotates in a reverse direction and passes the neutral position, the rotary member also passes the neutral position so as to temporarily intercept the light form the light emitting unit of the direction sensor. As a result, a temporary change of the electric signals occurs. According to such a change of electric signals, the electronic control unit detects that the steering shaft rotates in the reverse direction.

Figure 10:
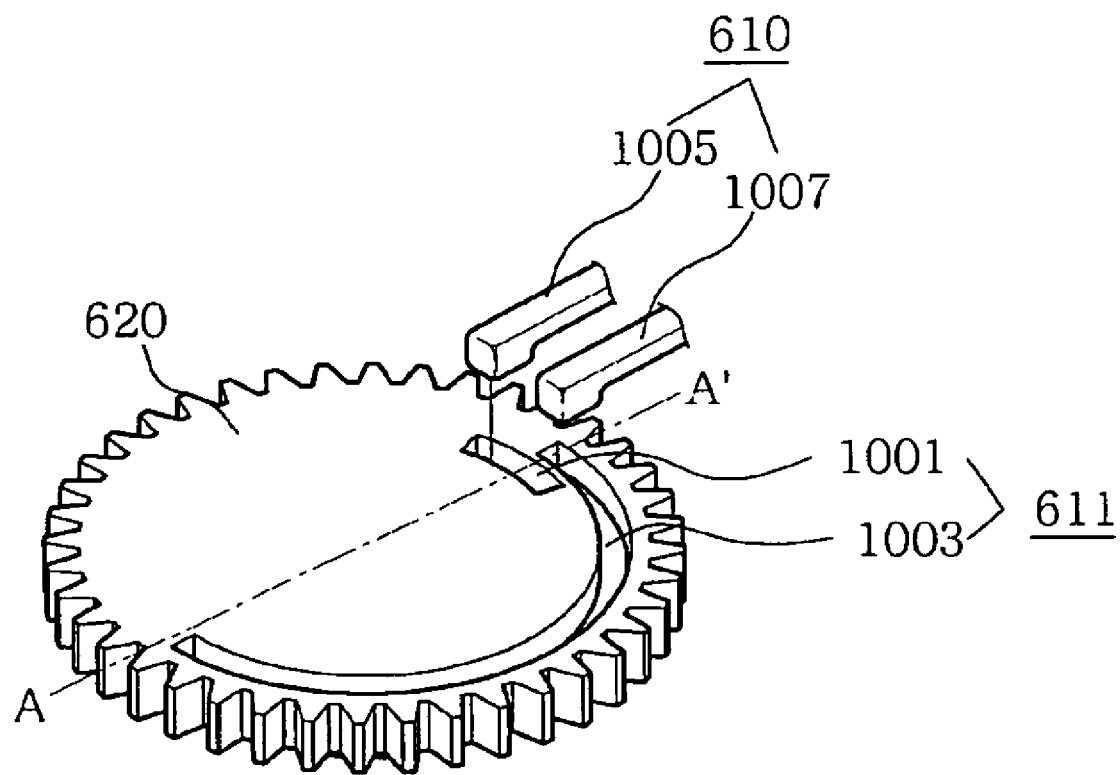
FIG. 10 is a perspective view showing a part of the steering angle sensor according to the second embodiment of the present invention.

FIG. 10 a partial perspective view showing a steering angle sensor according to the second embodiment of the present invention.

In the steering angle sensor according to the second embodiment of the present invention, as shown in FIG. 10, the slot 611 includes a first slot 1001 having a desired length, and a second slot 1003 having a length longer than the first slot 1001. The direction sensor 610 includes a first direction sensor 1005 operating according to the movement of the first slot 1001 and a second direction sensor 1007 operating according to the movement of the second slot 1003. Further, the first and second slots 1001 and 1003 are coaxial with each other and have a circular arc shape.

In the steering angle sensor according to the first embodiment of the present invention as described above, there is a problem in that it is difficult to process signals at a time when the rotary member passes by the neutral position, because only one slot is formed. Further, there is another problem in that it is difficult for the direction sensor to detect the neutral position accurately because of various errors occurring during steering.

Meanwhile, in the steering angle sensor according to the second embodiment of the present invention, when the rotary member 620 passes the neutral position A-A', the first and second direction sensors 1005 and 1007 operate respectively as the first and second slots 1001 and 1003 move.

In other words, the first slot 1001 and the first direction sensor 1005 detect the neutral position A-A' to transmit the first signal to the electronic control unit (not shown), while the second slot 1003 and the second direction sensor 1007 also detect the neutral position A-A' to transmit the second signal to the electronic control unit.

In this case, therefore, the electronic control unit compares the first signal with the second signal and calculates a value in a predetermined range, thereby recognizing a position corresponding to the value as the neutral position A-A'.

The steering angle sensor of the second embodiment of the present invention has the same configuration and operation as that of the steering angle sensor according to the first embodiment of the present invention. Therefore, the same reference numerals denote the identical elements, and the detailed description of the configuration and operation will be omitted.

As described above, according to the present invention, the steering angle sensor detects the absolute steering angle of the steering shaft using the direction sensor, which detects the rotation direction of the steering shaft through the multi-step reduction gear, and the motor position sensor which detects the rotation angle of the rotation shaft of the electric motor. Hence, there is an advantage of reducing manufacturing costs of the steering apparatus.

While this invention has been described in connection with what is presently considered to be the most practical and preferred embodiment, it is to be understood that the present invention is not limited to the disclosed embodiment and the drawings, but, on the contrary, it is intended to cover various modifications and variations within the spirit and scope of the appended claims.

What is claimed is:

1. An electric power steering apparatus for calculating a steering angle of a steering wheel, the apparatus comprising:
   a steering shaft connected to a steering wheel of a vehicle;
   an electric motor for supplying auxiliary steering power to rotate the steering shaft;
   a direction sensor for detecting a rotational direction of the steering shaft, the direction sensor including a light emitting unit and a light receiving unit which face each other;
   a rotary member coupled to the steering shaft and rotating as the steering shaft rotates, the rotating member being interposed between the light emitting unit and the light receiving unit and having at least one slot configured to detect the rotational direction of the steering shaft as the steering shaft rotates, the rotary member rotating less than 180 degrees with respect to an entire rotation range of the steering shaft;
   a motor position sensor coupled to the electric motor for detecting a rotation angle of a rotation shaft of the electric motor; and
   a control unit receiving electric signals from the direction sensor and the motor position sensor to calculate a steering angle of the steering wheel based on the rotational direction of the steering shaft and the rotation angle of the rotation shaft of the electric motor.

2. The electric power steering apparatus as claimed in claim 1, wherein the light emitting unit of the direction sensor includes a light emitting element, and the light receiving unit of the direction sensor includes a light receiving element.

3. The electric power steering apparatus as claimed in claim 2, wherein the light emitting element is a light emitting diode, and the light receiving element is a phototransistor.

4. The electric power steering apparatus as claimed in claim 1, wherein a first gear is formed on an outer peripheral surface of the steering shaft, a second gear is formed on an outer peripheral surface of the rotary member, and at least one reduction gear is disposed between the steering shaft and the rotary member to move in combination with the first and second gears.

5. The electric power steering apparatus as claimed in claim 4, wherein the reduction gear includes at least two multistage gears.

6. The electric power steering apparatus as claimed in claim 1, wherein the slot includes a first slot having a prescribed length and a second slot having a length longer than the first slot, the direction sensor includes a first direction sensor operating according to the movement of the first slot and a second direction sensor operating according to the movement of the second slot, and the control unit compares the signal of the first direction sensor with the signal of the second direction sensor to calculate the steering angle.

7. The electric power steering apparatus as claimed in claim 6, wherein the first and second slots respectively have a circular arc shape, which are coaxial with each other and spaced apart from each other.

8. The electric power steering apparatus as claimed in claim 7, wherein a straight line extending from a center portion passes both one end of the first slot and one end of the second slot.

\* \* \* \* \*